June 1, 1926.
H. L. BURK
1,587,144
ANTIGLARE DEVICE
Filed Jan. 10, 1925
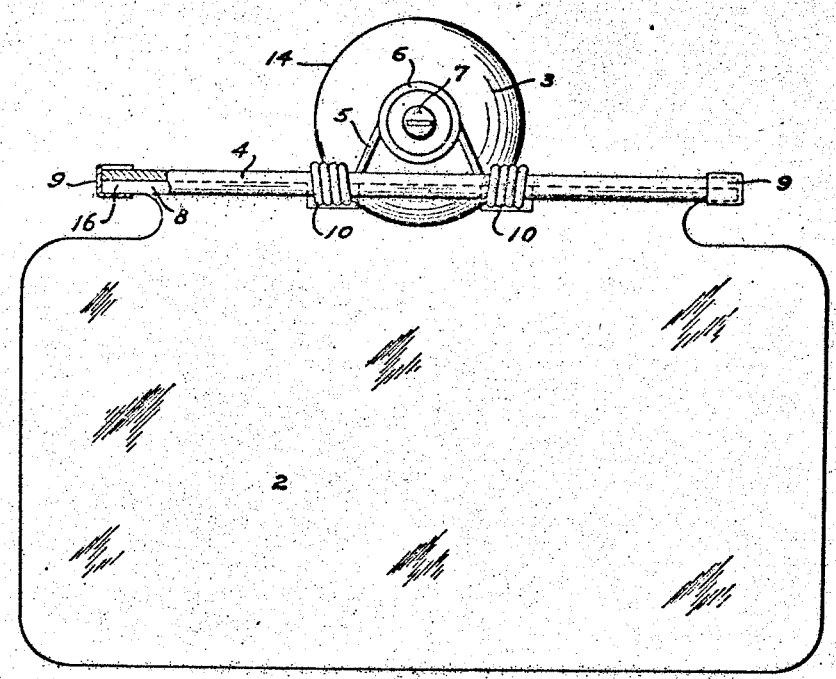
Fig. 1
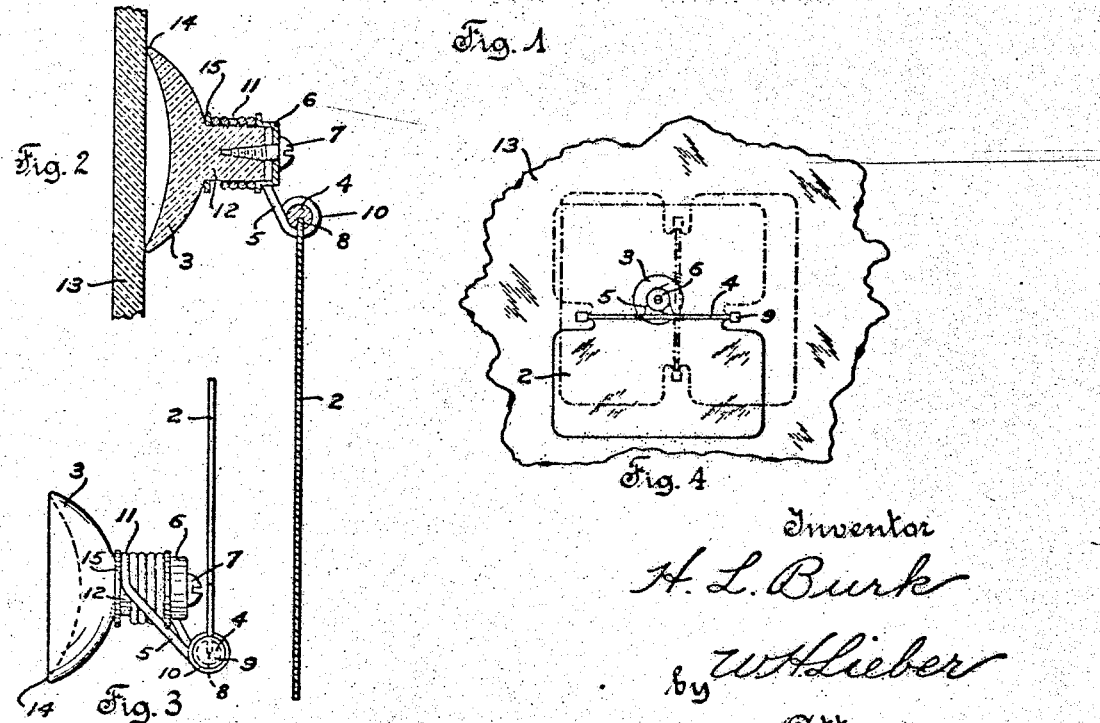
Fig. 2
Fig. 3
Fig. 4
Inventor
H. L. Burk
by W. H. Lieber
Attorney Patented June 1, 1926.

1,587,144

UNITED STATES PATENT OFFICE.

HENRY L. BURK, OF MILWAUKEE, WISCONSIN.

ANTIGLARE DEVICE.

Application filed January 10, 1925. Serial No. 1,521.

This invention relates in general to improvements in the art of promoting safety by preventing interference with the normal vision of operators of machinery, and relates more specifically to improvements in the construction and mode of attaching and of manipulating anti-glare devices especially applicable for the protection of the eyes of the drivers or operators of automobiles, aeroplanes, street cars, locomotives and like conveyances.

An object of the invention is to provide a new and useful anti-glare device which is simple in construction and efficient in operation.

It is a well established fact that a great many automobile and similar accidents have resulted primarily from obstruction of the vision of a driver by the glare produced by the head-lights of an approaching machine. Many appliances for eliminating this cause of accidents, have heretofore been proposed, but none of these prior devices has proven successful. In one type of prior anti-glare attachment, a pair of laterally spaced rubber vacuum cups which are directly attachable by adhesion to part of a vehicle, provide a support for a transparent anti-glare shield which is adjustable relatively to the vehicle wind-shield only about an axis disposed substantially parallel to the plane of the wind-shield. This type of anti-glare attachment is objectionable because it necessitates the use of a relatively large anti-glare shield to cover a sufficient range of wind-shield area, and the large anti-glare shield cannot be conveniently displaced to avoid obstruction to the driver's vision when the anti-glare device is not in use. In another type of prior anti-glare attachment, a transparent circular anti-glare shield is eccentrically and pivotally associated with a rubber vacuum cup by virtue of a pivot disposed substantially perpendicular to the plane of the wind-shield. This latter type of appliance is objectionable because the anti-glare shield cannot be swung away from the wind-shield when not in use, thus producing a constant obstruction to the view unless the appliance is completely removed. While other types of attachments have been proposed, all of the prior devices have proven uncommercial either because of the above mentioned objections or because of undesirable complications in the constructions and means of attachment thereof.

The present invention contemplates provision of an improved anti-glare attachment which eliminates substantially all of the objectionable features of the devices of the prior art. Some of the more specific objects and advantages attainable with an attachment embodying the present improvement are as follows. The improved device is extremely simple and compact in construction and permits protection of a relatively large range of vision in spite of the fact that a comparatively small anti-glare shield is utilized. The securing means of the improved device comprises a single vacuum cup, and the anti-glare shield is universally adjustable and frictionally retained in adjusted position with respect to the single support. The appliance may be manufactured at minimum cost, may be readily applied and removed, and may be quickly assembled and dismantled. The improved accessory is neat in appearance and is capable of attachment and use wherever the glare nuisance exists. These and other objects and advantages of the present improvement will be apparent in the course of the following description.

While a number of specific terms such as "automobile" and "wind-shield" are employed herein for purposes of facilitating the description, it is not intended to thereby limit the scope of the protection. The device is obviously applicable to various types of conveyances and in other places where the glare of strong lights tends to obstruct the vision of an individual.

A clear conception of an embodiment of the invention and of the mode of applying and of manipulating devices constructed in accordance therewith, may be had by referring to the drawing accompanying and forming a part of this specification in which like reference characters designate the same or similar parts in the various views.

Fig. 1 is a front elevation of an improved anti-glare attachment for vehicles or the like.

Fig. 2 is a central section through an improved anti-glare attachment, showing the same applied to a fragment of plate glass.

Fig. 3 is a fragmentary side view of the improved anti-glare device.

Fig. 4 is a front view drawn to a reduced scale, of the improved anti-glare device attached to a fragment of glass and showing the anti-glare shield in several positions of adjustment.

The improved anti-glare device specifically shown in the drawing, comprises in general a rubber suction or vacuum cup 3 forming a single support or means of attachment; a central boss or pivot 12 formed integral with the cup 3 and disposed substantially perpendicular to the plane of attachment of the cup; a longitudinally slotted pivot and supporting rod 4 disposed laterally adjacent to the pivot 12 and extending substantially parallel to the plane of attachment of the cup 3; a single resilient member or spring 5 connecting the rod 4 with the pivot 12; and a transparent anti-glare shield 2 detachably associated with the rod 4.

The vacuum cup 3 is preferably provided with a slightly rounded peripheral gripping edge 14 and is capable of attachment by adhesion or suction to any relatively hard and smooth surface such as the surface of a plate glass windshield 13 as shown in Fig. 2. The cup 3 and the pivot 12 formed integral therewith, may be formed of moulded relatively pliable rubber. As shown, the pivot and supporting rod 4 which may be formed of aluminum wire, has a slot 8 extending throughout its length, but this rod may obviously be formed of two half round pieces if desired. The medial portion of the resilient member or spring 5 is formed as a coil 11 adapted to frictionally embrace the pivot 12 of the vacuum cup 3, the portion of the coil adjacent to the cup engaging a bearing washer 15 and the opposite end of the coil 11 being engaged by an adjustable cap 6 which is retained in position at the end of the pivot 12 by means of a screw 7. The ends of the spring 5 are formed as loops 10 adapted to frictionally embrace the pivot rod 4 on opposite sides of the pivot 12. The transparent anti-glare shield 2 may be made of tinted celluloid and has an edge snugly fitted within the slot 8 of the rod 4. The shield 2 may be held within the slot 8 by means of friction caps 9 engaging the ends of the rod 4 and extending over oppositely extending projections 16 formed integral with the shield 2.

When the improved anti-glare device is applied and is ready for service, the vacuum cup 3 is attached to the windshield 13 in a well known manner and forms the sole support for the appliance. The attachment may be effected at any desirable place and the cup 3 is retained in position by adhesion alone. The anti-glare shield 2 is then universally adjustable relatively to the wind-shield 13 and the cup 3, about the pivot 12 and the rod 4, the pivot 12 permitting movement of the shield 2 in planes substantially parallel to the windshield 13 and the pivot afforded by the rod 4 permitting movement to positions transversely of the wind-shield. The range of area of the wind-shield 13, which may be covered by the device is obviously a circle concentric with the pivot 12 and having a radius equal to the distance from the axis of the pivot 12 to the most distant or remote corner of the shield 2. The shield 2 may also be quickly swung out of service either by utilizing the pivot 12 or the rod 4 as an axis and is effectively retained in any position of adjustment by virtue of the frictional engagement between the coil 11 and the pivot 12 and between the loops 10 and the rod 4.

The simplicity and neatness of appearance of the structure is obvious from a glance at the drawing. The rubber cups 3 are of relatively standard construction and may be produced at moderate cost. The washers 15, caps 6, and the caps 9 may be formed of sheet metal with the aid of punches and dies, and the transparent anti-glare shields 2 may likewise be punched from sheet celluloid of suitable color and thickness. The rods 4 may be formed from wire stock and the screws 7 are of standard design, thus permitting manufacture of the parts at relatively low cost. The entire device may obviously be readily assembled and dismantled and the screw 7 serves as a convenient means for regulating the degree of friction between the coil 11 and the pivot 12.

It should be understood that it is not desired to limit the invention to the exact details of construction and to the precise mode of assemblage and operation of the specific device herein shown and described, for various modifications within the scope of the claims may occur to persons skilled in the art.

It is claimed and desired to secure by Letters Patent:—

1. An anti-glare device comprising, a single rubber vacuum cup formed for direct attachment to a vehicle wind-shield, a pivot formed integral with said cup and disposed substantially perpendicular to the wind-shield, a rod having a portion of circular cross-section forming a second pivot disposed substantially parallel to the wind-shield, a single spring connecting and frictionally engaging said pivots, and an anti-glare shield attached directly to said rod.

2. An anti-glare device comprising, a single rubber vacuum cup formed for direct attachment to a vehicle wind-shield, a pivot integrally attached to said cup and disposed substantially perpendicular to the windshield, a longitudinally slotted cylindrical rod located laterally of said cup pivot and forming a second pivot disposed substantially parallel to the wind-shield, a single spring connecting and frictionally engaging both of said pivots, and an anti-glare shield detachably secured within the slot of said rod.

In testimony whereof, the signature of the inventor is affixed hereto.

HENRY L. BURK.